(No Model.)
D. STOTLEMEYER.
AGRICULTURAL FORK.
No. 348,300. Patented Aug. 31, 1886.
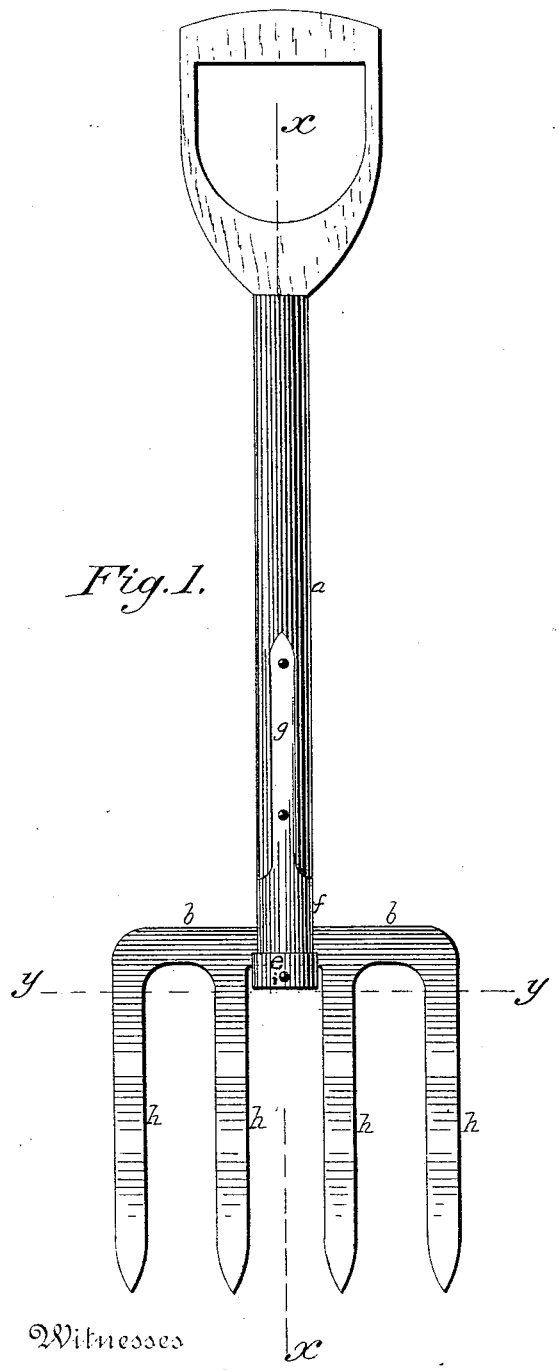
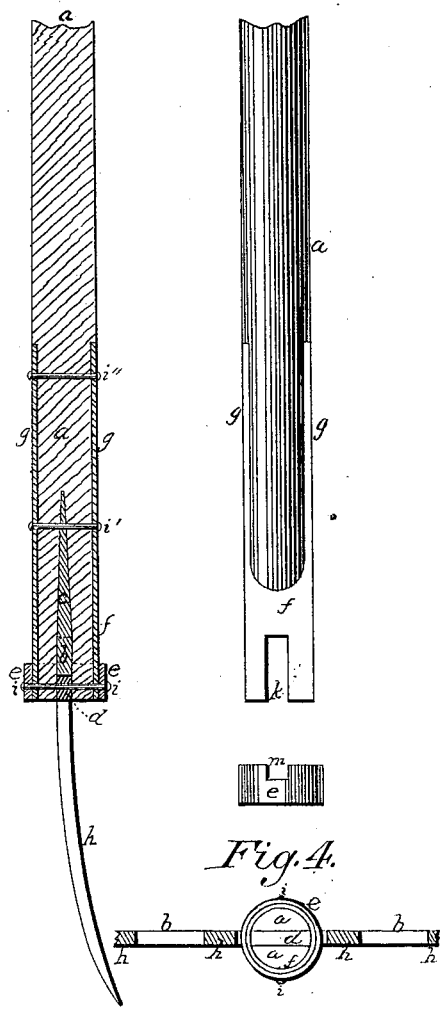

UNITED STATES PATENT OFFICE.

DEVOLT STOTLEMEYER, OF HANCOCK, MARYLAND.

AGRICULTURAL FORK.

SPECIFICATION forming part of Letters Patent No. 348,300, dated August 31, 1886.

Application filed June 30, 1886. Serial No. 206,706. (No model.)

*To all whom it may concern:*

Be it known that I, DEVOLT STOTLEMEYER, a citizen of the United States, residing at Hancock, in the county of Washington and State of Maryland, have invented a new article of manufacture in the shape of an Improved Agricultural Fork; and I do hereby declare the following to be a full, clear, and exact description of the invention, such as will enable others skilled in the art to which it appertains to make and use the same, reference being had to the accompanying drawings, which form a portion of this specification.

Figure 1 is a front view of my improved agricultural fork when the same shall be constructed with four tines; Fig. 2, a section of the same in the line $x\ x$ of Fig. 1; Fig. 3, a side view of the lower portion of the handle $a$ of the fork after the metallic casing $f$ has been combined with the slitted inner end of said handle; and Fig. 4 is a transverse section on the line $y\ y$ of Fig. 1, and showing, also, a plan view of the face of the inwardly-projecting end of the handle $a$ of the fork, after the said handle has been combined with the fork, as shown.

The novelty claimed in my improved agricultural fork consists in the method of combining its handle $a$ with the metallic portion of said fork, and this I accomplish in the following manner, namely: A slit, $k$, of the desired depth, is formed in the inner end of the fork-handle $a$, and a central perforation from the inner end of said slit is made to pass upward into the handle $a$, for the reception of the shank $c$ of the fork, as shown in Fig. 2. A metallic tubular casing, $f$, is made to closely embrace the inner end of the handle $a$, which casing has slits formed opposite to each other in its sides, and corresponding with the side openings of the slit $k$ in the inner end of said fork-handle. After the handle $a$ has been thus combined with its end casing, $f$, as shown in Fig. 3, the fork $b\ c\ h\ h\ h\ h$ is combined therewith, in the manner represented in the accompanying drawings, viz: The shank $c$ of the fork is received into the longitudinal perforation in the handle $a$, and its head $b$ passes up into the slit $k$ in the inner end of said handle and to such a distance as to leave an open space in the mouth of said slit of the depth of three-fourths of an inch, more or less, as may be desired. The ferrule or ring $e$ is then shrunk upon the inwardly-projecting incased end of the handle $a$, and the rivet $i$ is passed through apertures in its opposite sides, and also through apertures in opposite sides of the incasing-tube $f$, and also through apertures in the sides of the inwardly-projecting portion of the handle $a$ on each side of the slit $k$, and then secured in that position, as shown in Fig. 2. The open mouth of the slit $k$ is filled with melted lead or with any other suitable metal that will fuse at a comparatively low temperature; or, should it be preferred in practice, the said open mouth of the slit $k$ in the inwardly-projecting end of the handle $a$ may be filled with a block of wood, or metal, before the rivet $i$ shall be passed through the same, and then the said block may be secured in its position by the after-insertion of said rivet. I shall usually form notches $m$ in opposite sides of the inner end of the ferrule $e$, which notches will receive the inner edge of the cross-head $b$ of the fork, when the said ferrule is driven to its position on the inwardly-projecting end of the handle $a$, as shown in Fig. 1, and thus make a stiffer and firmer connection between the fork and its handle than would otherwise be the case; but as the use of any kind of a ferrule upon the inwardly-projecting slitted end of the handle of an agricultural fork is my own invention, I do not intend to restrict myself to the use of any particular shape or style of ferrule in said combination. The metallic casing $f$ of the inner end of the handle $a$ of the fork has two straps, $g\ g$, opposite to each other, which project outward therefrom, and are combined with each other and with the said handle by means of the rivets $i'\ i''$, as shown in Fig. 2. The rivet $i'$ also passes through an aperture in the shank $c$ of the fork, as shown in Fig. 2.

My said improved agricultural fork may be constructed with any number of tines that may be required by the agriculturist.

It will readily be perceived that my said method of combining the wooden and the metallic portions of an agricultural fork will produce a strong and durable fork.

What I claim as my invention, and desire to secure by Letters Patent, is—

The fork-handle $a$, having its lower end slitted, as described, the same embracing and passing beyond the head-bar $b$, and combined therewith by means of the ferrule $c$, the filling $d$, and the rivet $i$, substantially as and for the purpose herein set forth.

In testimony whereof I affix my signature in presence of two witnesses.

DEVOLT STOTLEMEYER.

Witnesses:
 Z. C. ROBBINS,
 L. McC. ROBBINS.